United States Patent [19]
Claux

[11] Patent Number: 4,761,017
[45] Date of Patent: Aug. 2, 1988

[54] SUPPORT SYSTEM FOR A STEERABLE VEHICLE WHEEL WHICH MAY ALSO BE A DRIVING WHEEL, AND ITS APPLICATION, IN PARTICULAR, TO AN AMPHIBIOUS VEHICLE

[76] Inventor: Philippe Claux, 26 rue Marcelle Tinayre Palisse, 19360 Malemort Sur Correze, France

[21] Appl. No.: 113,126

[22] Filed: Oct. 22, 1987

[30] Foreign Application Priority Data

Oct. 31, 1986 [FR] France ............... 86 15186

[51] Int. Cl.[4] ................... B60G 3/22; B60F 3/00
[52] U.S. Cl. ............................. 280/660; 180/252; 280/666; 280/696
[58] Field of Search ........... 180/72, 252; 280/96.3, 280/660, 663, 666, 691, 696, 771

[56] References Cited

U.S. PATENT DOCUMENTS

| | | | |
|---|---|---|---|
| 1,836,446 | 12/1931 | Christie | 280/666 |
| 2,024,199 | 12/1935 | Barnes | 180/72 |
| 2,552,690 | 5/1951 | Poirier | 180/73 |
| 3,666,036 | 5/1972 | Scerbo | 280/660 |
| 4,610,461 | 9/1986 | Guzzetta | 280/691 |

FOREIGN PATENT DOCUMENTS

| | | |
|---|---|---|
| 969375 | 5/1958 | Fed. Rep. of Germany . |
| 940078 | 12/1948 | France . |
| 1442746 | 5/1966 | France . |
| 161262 | 8/1985 | Japan .................. 180/252 |
| 439688 | 12/1935 | United Kingdom . |

OTHER PUBLICATIONS

Patent Abstracts of Japan, vol. 10, No. 40, 18.02.86-J-P-A-60 193 764 (Daihatsu Kogyo K.K.), 2.10.85.

*Primary Examiner*—Ross Weaver
*Attorney, Agent, or Firm*—Gerald J. Ferguson, Jr.

[57] ABSTRACT

A support system in accordance with the invention comprises: an oscillating arm (1) having a first end fitted with means (2) for mounting the oscillating arm to pivot relative to the body (6) of a vehicle in a direction which is substantially parallel to a longitudinal axis of the vehicle, and having a second end with a wheel bearing support (21) mounted thereon, said wheel bearing support being mounted to swivel about a swivel axis (19) mounted on the oscillating arm; oscillating arm positioning means (46) for maintaining the oscillating arm in a predetermined average position; and means (36) for controlling the orientation of the wheel bearing support (21) about the swivel axis (19). The system is characterized in that the swivel axis (19) is connected to the oscillating arm (1) via a member (15) for compensating the inclination of the oscillating arm, said member being mounted to pivot about a shaft which is fixed perpendicularly to the oscillating arm; and in that a link member (30) is hinged both to the inclination compensating member (15) and to the vehicle body (6) in order to constitute together with the oscillating arm (1) a hinged parallelogram.

6 Claims, 2 Drawing Sheets

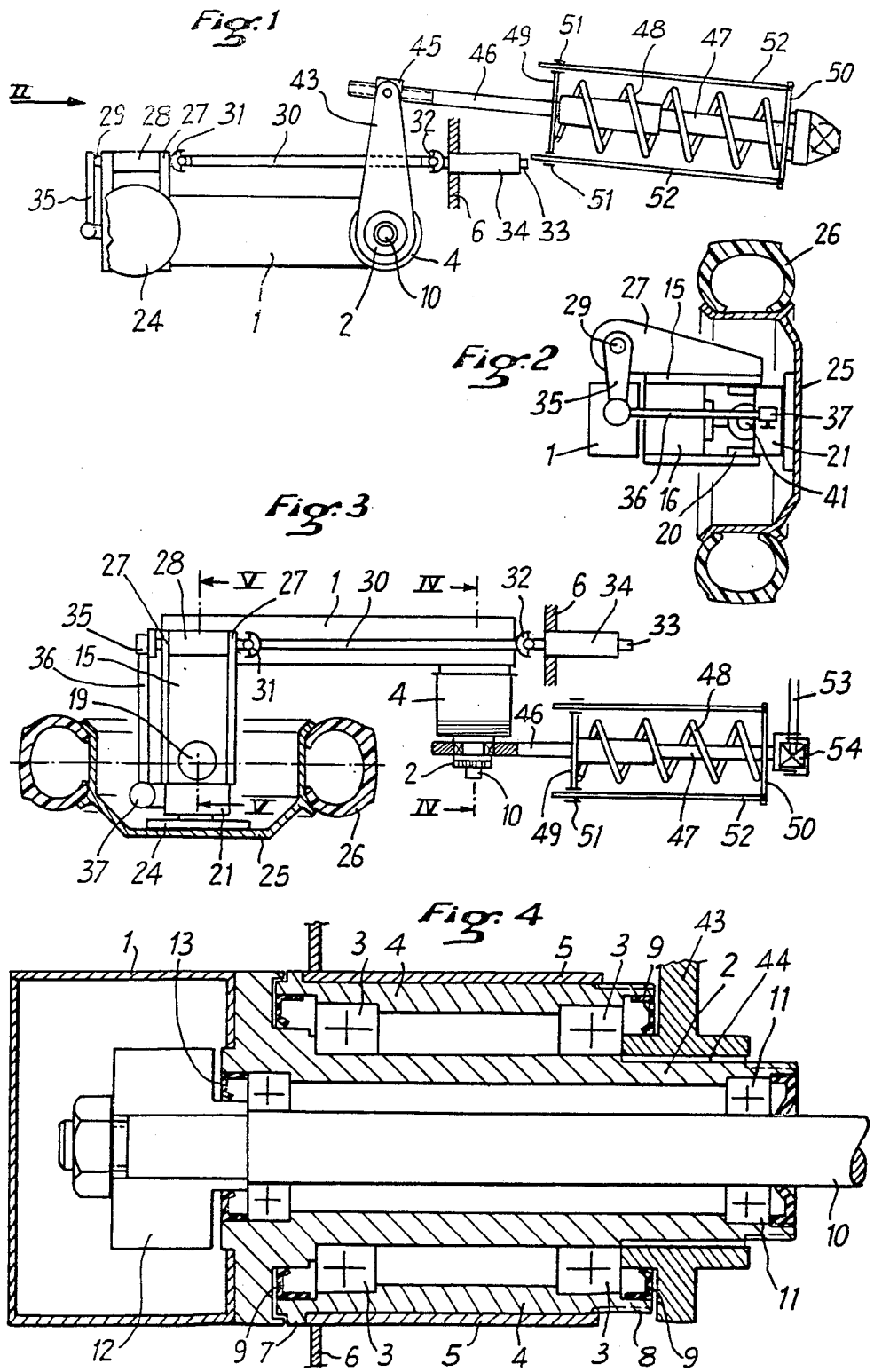

SUPPORT SYSTEM FOR A STEERABLE VEHICLE WHEEL WHICH MAY ALSO BE A DRIVING WHEEL, AND ITS APPLICATION, IN PARTICULAR, TO AN AMPHIBIOUS VEHICLE

The present invention relates to a support system for a steerable vehicle wheel which may also be a driving wheel, and to its application to a vehicle.

BACKGROUND OF THE INVENTION

Numerous support systems are already known for steerable wheels. The present invention relates more particularly to a steerable wheel support system enabling the ground clearance of the vehicle on which it is mounted to be varied. At present two types of wheel support system are known which are capable of varying a vehicle's ground clearance. In a first wheel support system, the wheel is mounted on an oscillating arm having one end fitted with means for mounting the oscillating arm to pivot relative to a vehicle body in a direction substantially parallel to a longitudinal axis of the vehicle. In known systems of this type for supporting a steerable wheel, a swivel axis is provided forming a constant angle with the oscillating arm such that the inclination of the swivel axis relative to the ground varies as the orientation of the oscillating arm is varied in order to modify ground clearance. This variation in the inclination of the swivel axis gives rise to variation in the inclination of the wheel when it is swivelled about the swivel axis in order to steer the vehicle. When the inclination of the wheel becomes excessive, the resultant force of the vehicle weight is no longer centered on the wheel tread, and this gives rise to considerable disturbance, in particular in the tire. That is why this firt type of wheel support system is generally not used for steerable wheels.

In a second type of wheel support system, the wheel is carried by an oscillating arm mounted to pivot in a direction which is substantially perpendicular to a longitudinal axis of the vehicle. In this case, a large change in vehicle ground clearance gives rise to a change in the vehicle wheel gauge, and here again, ground clearance cannot be changed to any large extent without giving rise to considerable disturbance in the tires.

An aim of the present invention is to provide a support system for a steerable vehicle wheel which enables the inclination of the wheel to be maintained substantially constant regardless of ground clearance and regardless of the steering that may be applied to the wheels.

SUMMARY OF THE INVENTION

In order to achieve this aim, the present invention provides a support system for a steerable vehicle wheel, the system comprising an oscillating arm having a first end fitted with means for mounting the oscillating arm to pivot relative to the body of a vehicle in a direction which is substantially parallel to a longitudinal axis of the vehicle, and having a second end with a wheel bearing support mounted thereon, said wheel bearing support being mounted to swivel about a swivel axis mounted on the oscillating arm; oscillating arm positioning means for maintaining the oscillating arm in a predetermined average position; means for controlling the orientation of the wheel bearing support about the swivel axis; a member for compensating the inclination of the oscillating arm, said member being mounted to pivot about a shaft which is fixed perpendicularly to the oscillating arm, and connecting the swivel axis to the oscillating arm; and a link member hinged both to the inclination compensating member and to the vehicle body in order to constitute together with the oscillating arm a hinged parallelogram; wherein the link member includes a longitudinal axis about which it is mounted to rotate, and the end of the link member adjacent to the inclination compensating member is connected to the wheel bearing support via a linkage structure.

Thus, when the orientation of the oscillating arm is changed relative to the vehicle body, the orientation of the swivel axis is changed in corresponding manner so that the swivel axis retains a substantially constant orientation relative to the ground, and the link member additionally provides the function of a member for controlling the orientation of the wheel about the swivel axis, thereby enabling the orientation of the wheel to be kept constant regardless of the inclination of the oscillating arm.

In accordance with an advantageous aspect of the invention, the means for mounting the oscillating arm on the body of the vehicle comprise a hinged shaft fixed perpendicularly to the oscillating arm, and the means for positioning the oscillating arm comprise a positioning crank having one end fixed perpendicularly to the hinge shaft, and a positioning link fixed to a second end of the positioning crank. Thus, longitudinal displacement of the positioning link changes the orientation of the oscillating arm and thus varies the vehicle's ground clearance.

According to other advantageous aspects of the invention, the positioning link is mounted to be adjustable in length between a point on the vehicle body and the second end of the positioning crank, and a spring-and-shockabsorber assembly is mounted on the positioning link and in series therewith. Thus, the ground clearance is easily changed by acting on the length of the positioning link and the spring-and-shockabsorber assembly allows oscillations of moderate amplitude to take place about the average postion of the oscillating arm.

According to another aspect of the invention, the oscillating arm, the support shaft for the member for compensating the inclination of the oscillating arm, and the hinge axis are all hollow, and wheel drive means extend inside the hollow shafts and the oscillating arm. Thus, by means of a compact structure, a wheel is obtained which is not only a steerable wheel but which is also a driving wheel.

According to a preferred embodiment of the invention, the wheel tread has a plane of symmetry and the swivel axis of the wheel lies in said plane of symmetry. Thus, changing the orientation of the wheel does not cause it to roll, and as a result the orientation of the wheels may be modified when stationary without giving rise to any slip, even if there is no differential device.

In an advantageous application of the invention, a self-propelled vehicle includes at least three wheel supports in accordance with the invention, and at least one of the following functions is provided on all of the wheels by a single control member: steering; ground clearance; and drive.

BRIEF DESCRIPTION OF THE DRAWINGS

An embodiment of the invention is described with reference to the accompanying drawings, in which:

FIG. 1 is a diagrammatic side elevation view of a wheel support system in accordance with the inventionand shown without the wheel;

FIG. 2 is an elevation view along direction II in FIG. 1, with the wheel being shown in section and with the arm-positioning means being omitted;

FIG. 3 is a plan view of the FIG. 1 system;

FIG. 4 is a section on a larger scale on line IV—IV of FIG. 3;

MORE DETAILED DESCRIPTION

Figure 5:
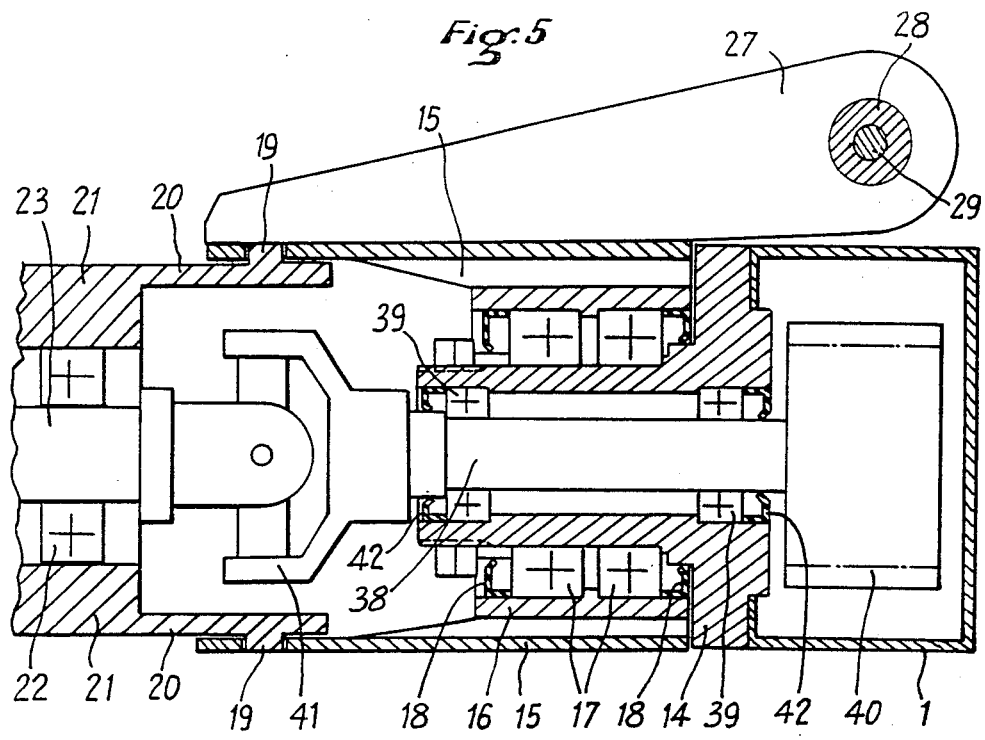
FIG. 5 is a section on a larger scale on line V—V of FIG. 3.

With reference to the figures, a wheel support system in accordance with the invention comprises a hollow oscillating arm 1 having a first end fixed to a hollow hinge shaft 2 extending perpendicularly to the longitudinal direction of the oscillating arm 1. The oscillating arm may be in the form, for example, of an elongate box section which is sufficiently rigid to transmit to a wheel the forces resulting from the weight and the motion of the vehicle. The hinge shaft 2 is fixed to one of the walls of the oscillating arm 1, for example by welding. The hinge shaft 2 is itself mounted by means of bearings 3 in a sleeve 4 which is itself received in a socket 5 fixed to the body 6 of the vehicle. The sleeve 4 is held in place inside the socket 5, for example, by means of an abutment 7 against the outside of the vehicle body 6 and a nut screwed onto a thread 8 on the inside of the vehicle (FIG. 4). The first end of the oscillating arm 1 is thus fitted with means for mounting the oscillating arm so that it pivots relative to the vehicle body 6 in a direction which is substantially parallel to a longitudinal axis of the vehicle. If watertight sealing is to be provided between the inside and the outside of the body where the hinge shaft 2 passes therethrough, sealing rings 9 are disposed at the ends of the sleeve 4 between the sleeve 4 and the hinge shaft 2. A motor drive shaft 10 is mounted inside the hollow hinge shaft 2 by means of bearings 11. One end of the shaft 10 extends into the inside of the oscillating arm 1 and carries a toothed wheel 12 which is fixed to the shaft 10. A sealing ring 13 is optionally provided between the drive shaft 10 and the hinge shaft 2.

At its end furthest from the hinge shaft 2, the oscillating arm 1 includes a hollow support shaft 14 which is fixed perpendicularly to the longitudinal dimension of the oscillating arm 1 and thus extends parallel to the hinge shaft 2. In the embodiment shown, the support shaft 14 extends from the same side of the oscillating arm 1 as does the hinge shaft 2. Ribbed plates 15 extend parallel to the support shaft 14 and are fixed to the outer cage 16 of bearings 17 mounted on the support shaft 14. Sealing rings 18 provide sealing between the cage 16 and the support shaft 14. The ends of the plates 15 furthest from the oscillating arm 1 include openings which receive swivel studs 19 mounted on tabs 20 of a wheel bearing support 21. The studs 19 thus provide a swivel axis for the wheel bearing support 21. A wheel bearing 22 is mounted inside the wheel bearing support 21 and in turn supports a wheel axle 23 which terminates on the outside in a hub 24 and onto which a wheel rim 25 is mounted in conventional manner, for example by means of bolts. The wheel rim 25 supports a tire 26 whose thread is symmetrically disposed about a plane containing the swivel axis 19 of the wheel bearing support 21.

Cheeks 27 are fixed perpendicularly to one of the ribbed plates 15 and support a bearing 28 in which there pivots a length of shaft 29 which is connected to an elongate link member 30 by means of a universal joint 31. The opposite end of the link member 30 is connected via a universal joint 32 to a steering control shaft 33 which pivots in a bearing 34 which is fixed to a portion of the vehicle body 6 that extends perpendicularly to the oscillating arm 1. The link member 30 extends parallel to the oscillating arm 1 in such a manner that the assembly comprising the oscillating arm 1, a portion of the vehicle body 6, the moving assembly mounted on the support shaft 14, and the link member 30 consitutes a hinged parallelogram. It can thus be seen that when this prallelogram is deformed, the swivel axis constituted by the swivel studs 19 remains at a constant orientation, and the plates 15 thus constitute a member for compensating the inclination of the oscillating arm 1.

A lever 35 is fixed to the end of the shaft 29 furthest from the universal joint 21 and supports a steering link 36 which is in turn connected to the wheel bearing support 21 via a knuckle joint 37. Thus, the link member 30 serves not only to constitute one of the sides of a deformable parallelogram, but also serves as a shaft for transmitting steering control.

A length of drive transmission shaft 38 is mounted inside the hollow support shaft 14 by means of bearings 39. The end of the transmission shaft 38 which extends inside the oscillating arm 1 carries a toothed wheel 40 while its opposite end is connected to the wheel axle 23 via a universal joint 41 whose hinge axes lie in a plane containing the swivel axis of the studs 19. Sealing rings 42 are provided in the vicinity of the ends of the transmission shaft 38 in order to provide sealing between the transmission shaft 38 and the hollow support shaft 14. The toothed wheel 12 and the toothed wheel 14 are connected to each other in conventional manner (not shown) either by means of a chain or else by means of a series of intermediate gearwheels mounted to rotate inside the oscillating arm 1.

The average position of the oscillating arm 1 is determined by positioning means comprising a positioning crank lever 43 which is fixed to the hinge shaft 2, for example by means of fluting 44 (FIG. 4) provided at that end of the hinge shaft 2 which extends inside the vehicle. The crank lever 43 extends perpendicularly to the hinge shaft 2. At its end furthest from the hinge shaft 2, the positioning crank lever 43 has a nut 45 which is hinged perpendicularly to the end of the positioning crank lever 43. The threaded end of a positioning link 46 is engaged in the nut 45. The positioning link 46 is connected in series with a shock absorber 47 disposed inside a spring 48 which is itself held between a plate 49 fixed to one of the portions of the shock absorber 47 and a plate 50 which is fixed to the other portion of the shock absorber 47. The plate 49 includes guides through which there extend rods 52 which are connected to the plate 50. The plate 50 is connected to a shaft 53 for positioning the oscillating arm 1 via a gear arrangement 54 which is fixed to the body of the vehicle. When the positioning shaft 53 rotates, the plate 50 is caused to rotate about the axis of the shock absorber and it transmits this rotary motion to the plate 49, and thus to the positioning link 46 by means of the rods 52. It may be observed that during this rotary motion the shock absorber is thus not caused to rotate but continues to act as a shock absorber by virtue of longitudinal displacement made possible by the rods 52 sliding in the guides 51. Rotation of the link 46 relative to the nut 54 changes the effective length of the link 46 and thus modifies the average position of the oscillating arm 1, with the oscillating arm 1 being naturally capable of oscillating about said average position by virtue of the variations in length which are made possible by the shock absorber 47 and the spring 48.

It may be observed that as the position of the oscillating arm 1 is varied, the lengths of the vehicle drive and steering shaft lines do not change and it is therefore possible to vary the ground clearance of the vehicle to a considerable extent without disturbing its steering or drive functions.

Figure 6:
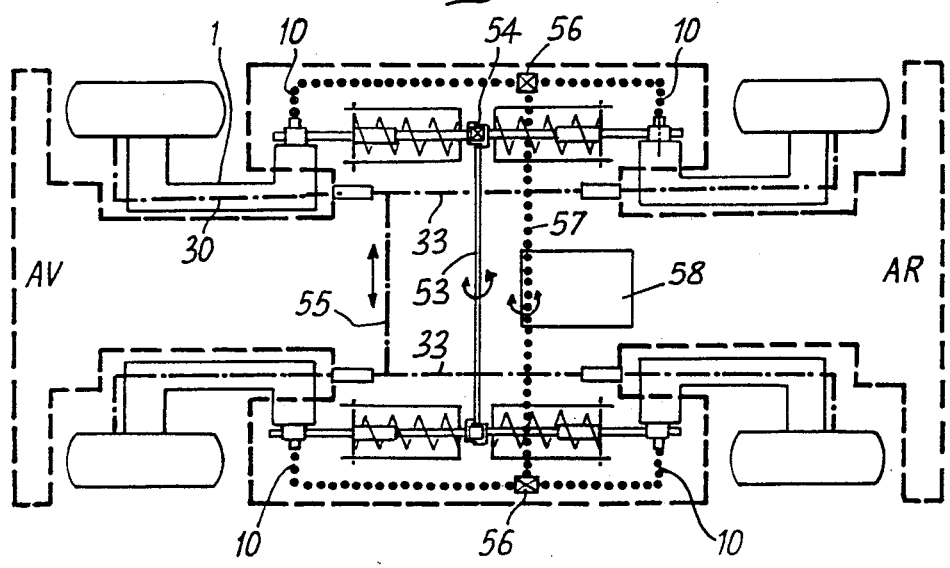
FIG. 6 is a diagrammatic plan view of an amphibious vehicle fitted with four modules in accordance with the invention.

FIG. 6 is a diagram showing an amphibious vehicle fitted with four wheel supports in accordance with the invention. It may initially be observed that these four wheel supports are entirely identical from the structural point of view, with the only modification that a wheel support needs as a function of its position on the vehicle being the position of the bearing 28 relative to the support shaft 14 insofar as it is desired that the steering shaft line should always be above the oscillating arm 1. In FIG. 6, the vehicle body is drawn using a heavy dashed line, the movement for positioning the oscillating arms 1 is drawn using a continuous line, the movement for controlling steering is drawn as a heavy dot-dashed line, and the drive motion is drawn as a heavy dotted line. It can be seen that the wheel support for each wheel passes through the body at two points only, i.e. where the ring 4 is received in the socket 5 and where the steering shaft 33 passes through the corresponding bearing 34. In both of these cases it may be observed that the motion is purely a rotary motion and it is therefore very easy to ensure that these passages are watertight. Further, it may be observed that the steering shaft 33 for the wheel supports situated on the same side of the vehicle are at the same level and that it is therefore possible to use a single steering control shaft 33 for both wheel supports. If it is desired to control steering of all four wheels simultaneously, all that needs to be done is to interconnect the two common steering control shafts 33 by link means 55, for example an endless loop chain passing over chain-wheels fixed to the steering control shafts 33.

Similarly, the means for positioning the oscillating arms 1 may also be associated in pairs on each side of the vehicle by providing a common gear arrangement 54 having two outlets. In this case, the positioning control shaft 53 is common to all four wheel supports and the ground clearance is modified simultaneously and identically on all four wheels by rotating the single shaft 53. The same structure may be used for transmitting drive, with the drive shafts 10 for the wheels being interconnected in pairs by gear arrangements 56 which transmit motion to the drive shafts 10 from a common drive shaft 57 connected to a motor 58.

It may also be observed that braking may be provided by acting on the shafts 10 or on the shaft 57, i.e. inside the vehicle body which is advantageous for an amphibious vehicle.

It may be observed that the support system in accordance with the invention makes it possible to obtain caster, camber, and toe-in parameters which remain constant regardless of the vehicle's ground clearance. Although the embodiment shown in FIG. 6 has single common controls for steering, ground clearance, and vehicle drive, it is naturally possible to provide selective coupling means enabling any of these functions to apply to one wheel only or to a pair of wheels.

Naturally the invention is not limited to the abovedescribed embodiment and variants may be applied thereto without going beyond the scope of the invention. In particular, although the hinge shafts 2 and the support shafts 14 extend from the same sides of the oscillating arms 1 in the embodiment illustrated, wheel supports may be provided in which these pairs of shafts extend from opposite sides. Pneumatic or hydraulic systems may be provided to provide power assistance both for positioning the oscillating arm and for steering.

With reference to the spring-and-shock absorber assembly 47–48 it may be observed that abutments may be provided on the rods 52 for the plate 49 so as to limit the stroke and the prestress of the spring 48.

Further, although each wheel support in the embodiment illustrated includes a single shaft 30 which serves simultaneously both to compensate inclination and to control steering, it may be necessary, in particular when very heavy loads are involved, to provide a parallel link in addition to the shaft 30, but connected to the body 6 and to the first cheek 27 by simple hinges rather than via universal joints, with the axes of these hinges being naturally parallel to the shafts 10 and 38 and being situated level with the universal joints 31 and 32 so that the link remains constantly parallel with the shaft 30. In this way, the additional link absorbs axial forces and the shaft 30 only transmits the couple for controlling steering.

I claim:

1. A support system for a steerable vehicle wheel, the system comprising:
    an oscillating arm having a first end fitted with means for mounting the oscillating arm to pivot relative to the body of a vehicle in a direction which is substantially parallel to a longitudinal axis of the vehicle, and having a second end with a wheel bearing support mounted thereon, said wheel bearing support being mounted to swivel about a swivel axis mounted on the oscillating arm;
    oscillating arm positioning means for maintaining the oscillating arm in a predetermined average position;
    means for controlling the orientation of the wheel bearing support about the swivel axis;
    a member for compensating the inclination of the oscillating arm, said member being mounted to pivot about a shaft which is fixed perpendicularly to the oscillating arm, and connecting the swivel axis to the oscillating arm; and
    a link member hinged both to the inclination compensating member and to the vehicle body in order to constitute together with the oscillating arm a hinged parallelogram;
    said link member including a longitudinal axis about which it is mounted to rotate, and the end of the link member adjacent to the inclination compensating member being connected to the wheel bearing support via a linkage structure.

2. A wheel support system according to claim 1, wherein the means for mounting the oscillating arm on the body of the vehicle comprise a hinged shaft fixed perpendicularly to the oscillating arm, and the means for positioning the oscillating arm comprise a positioning crank having one end fixed perpendicularly to the hinge shaft, and a positioning link fixed to a second end of the positioning crank.

3. A wheel support system according to claim 2, wherein the positioning link is mounted to be adjustable in length between a point on the vehicle body and the second end of the positioning crank.

4. A wheel support system according to claim 2, including a spring-and-shockabsorber assembly mounted on the positioning link and in series therewith.

5. A wheel support system according to claim 2, wherein the oscillating arm, the support shaft for the member for compensating the inclination of the oscillating arm, and the hinge axis are all hollow, and wherein wheel drive means extend inside the hollow shafts and the oscillating arm.

6. A wheel support system according to claim 1 wherein the wheel tread has a plane of symmetry and the swivel axis of the wheel lies in said plane of symmetry.

* * * * *